United States Patent [19]
Oberpichler

[11] 3,842,693
[45] Oct. 22, 1974

[54] HYDRAULIC CONTROL DEVICE FOR CONTROLLING DOWNSHIFT OF AUTOMATIC TRANSMISSION

[75] Inventor: Gerd Oberpichler, Braunschweig, Germany

[73] Assignee: Volkswagenwerk Aktiengesellschaft, Wolfsburg, Germany

[22] Filed: July 20, 1973

[21] Appl. No.: 381,148

[30] Foreign Application Priority Data
July 31, 1972 Germany............................ 2237351

[52] U.S. Cl..................... 74/864, 74/752 C, 74/868
[51] Int. Cl........................................ B60k 21/06
[58] Field of Search........... 74/752 C, 864, 868, 869

[56] References Cited
UNITED STATES PATENTS
2,987,942  6/1961  Jania............................... 74/752 C
3,623,382  11/1971  Chana................................. 74/864

Primary Examiner—Benjamin W. Wyche
Assistant Examiner—J. Reep
Attorney, Agent, or Firm—Brumbaugh, Graves, Donohue & Raymond

[57] ABSTRACT

The control slide valve in a hydraulically operated automatic transmission has a larger surface area for the end of its movable piston that is exposed to the velocity-dependent control pressure than for the end exposed to the pressure of the clutch conduit. As a result, the control slide valve spring can be eliminated and the transmission can perform a smooth kickdown shift.

3 Claims, 1 Drawing Figure

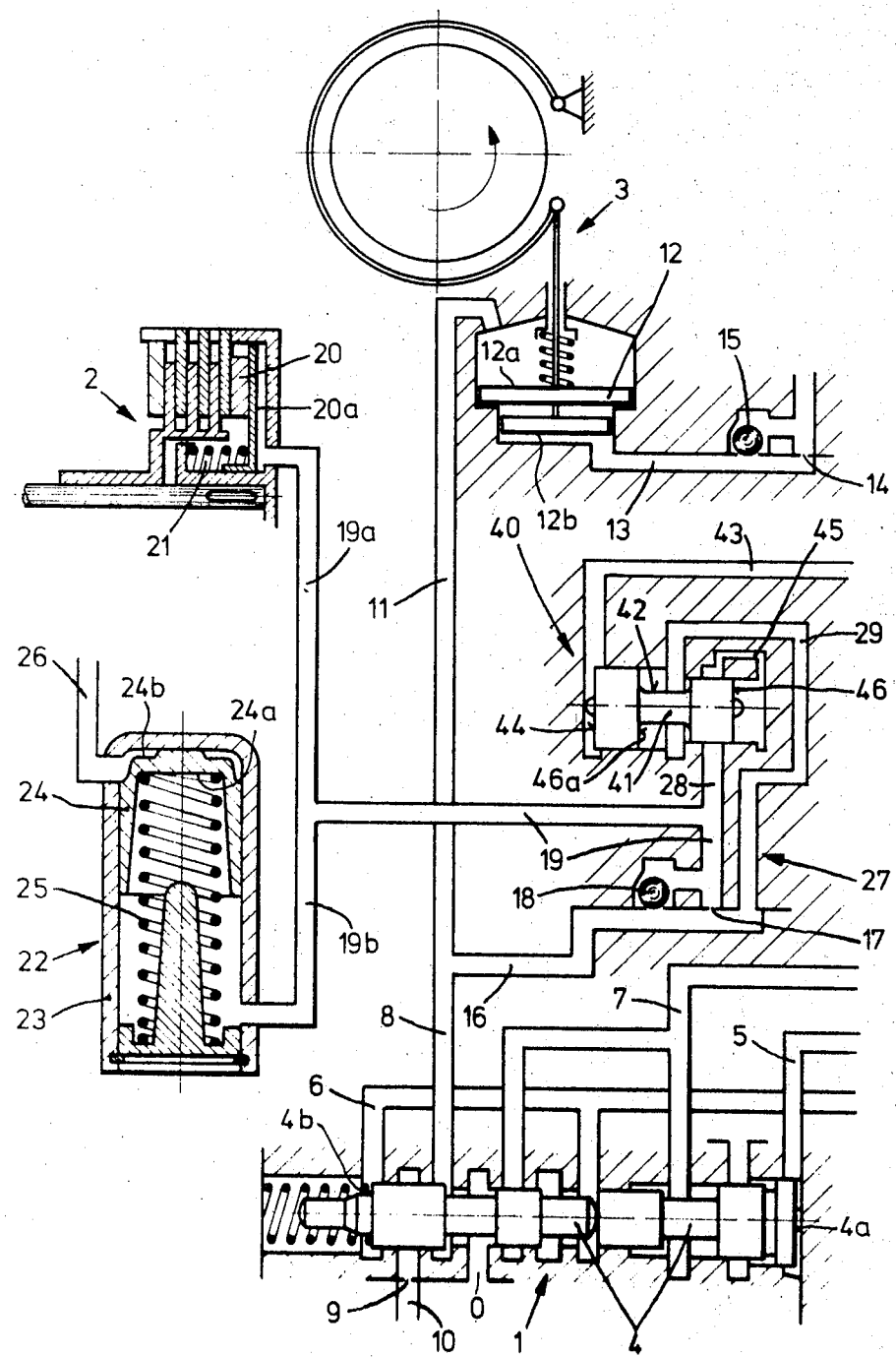

HYDRAULIC CONTROL DEVICE FOR CONTROLLING DOWNSHIFT OF AUTOMATIC TRANSMISSION

BACKGROUND OF THE INVENTION

This invention relates to the control of the automatic shifting of the planetary gears when down-shifting an automatic transmission for motor vehicles and, more particularly, to a novel improvement in the control system which results in a smooth kickdown shift.

In some conventional automatic transmissions, such as the one disclosed in U.S. Pat. No. 3,650,162, synchronism between engine and clutch during a down shift is achieved only at selected speeds. At all other speeds, synchronism is only approximate, and a shifting jolt is felt by the occupants of the vehicle as it automatically changes gears. This source of annoyance to the passengers and wear on the transmission can be overcome with a hydraulic control device such as that described in my copending application Ser. No. 273,720, filed July 21, 1972, now U.S. Pat. No. 3,800,627 and assigned to VOLKSWAGENWERK AKTIENGESELLSCHAFT. This copending application discloses a transmission in which a planetary gear set is provided with a hydrodynamic primary shifting element, such as a torque converter. A clutch is associated with a higher gear of the set and a brake is associated with the lower gear. The brake is operated by a piston which is moved axially in either of two directions depending on the pressure applied to its ends. The servo pressure of the transmission is applied through a throttle or constriction to one end of the brake piston, thereby urging it in the direction which results in the application of the brake. This servo pressure is resisted by a spring and by pressure from a main slide valve on the other end of the piston. Pressure in the conduit from the main slide valve is dependent on the position of the main valve which is in turn dependent on control pressures derived from the vehicle velocity, the engine load and the conditions for a kick-down shift. On shifting to a lower gear the main slide valve disconnects its conduit from the transmission servo pressure and connects it to the atmosphere. This removes the pressure from one end of the brake piston, allowing the brake to operate in a fixed period of time controlled by the servo pressure applied through the brake throttle.

The main slide valve conduit is also connected through a throttle or constriction to the clutch for the higher gear in such a way that the pressure in the conduit will cause the clutch to engage. However, to engage the clutch the pressure must be great enough to overcome a spring in the clutch which tends to disengage it. Ordinarily, reducing the pressure in the main slide valve conduit to atmospheric levels would cause the clutch to disengage rapidly as the pressure difference across the clutch throttle was reduced; but this is delayed by the action of a pressure reservoir connected in parallel with the clutch, which allows the servo pressures in the conduit to the clutch to decrease slowly until the reservoir has become exhausted.

Once the clutch is disengaged the engine speed increases in order to ensure that the engine is at the proper speed when the brake applies the lower gear at the end of the fixed period of time. The exact moment when the pressure in the conduit to the clutch is low enough to allow it to disengage must be controlled. This is accomplished with a control slide valve. This control slide valve is located in a conduit that bridges the clutch throttle and is normally closed by a piston in the valve, movable by the fluid pressure in the conduit leading to the clutch. When this pressure decreases during a down-shift in gears, a spring and a fluid pressure dependent on the velocity of the vehicle move the piston of the control slide valve so as to open the valve and exhaust the conduit leading to the clutch. The exact moment when this occurs will depend on the velocity of the vehicle because of the velocity-dependent pressure tending to open the valve. In the above-identified U.S. Pat. No. 3,650,162 there is no velocity-dependent down shift because its kick-down valve positions its throttle valve so that the throttle-dependent pressure is made equal to the servo pressure.

When the vehicle is travelling at a constant velocity in high gear and the accelerator is rapidly depressed, as when the driver wishes to pass another vehicle, the transmission automatically shifts to a lower gear in an attempt to match the increased engine speed. This change in gears is known as a kick-down shift. While the transmission control system described above allows for smooth transitions from a higher gear to a lower gear under ordinary conditions, it does not provide the same operation under a kick-down shift.

Depending on the characteristic shape of the control pressure curve, which is a function of the vehicle speed, the desired position of the shifting points and the magnitude of the servo pressure, it may happen that the piston of the control slide valve does not stop in the closed position when the vehicle is traveling at a uniform high rate of speed. This may occur because the velocity-dependent control pressure and the spring exert a larger force on the control piston then does the servo pressure. This is particularly true when the vehicle is travelling at high speeds and the accelerator is not depressed. Under these conditions the servo pressure can only equal or slightly exceed the velocity-dependent control pressure. During abruptly initiated kick-down shifts, which cause an immediate displacement of the piston of the main slide valve, the servo pressure appearing when the throttle is suddenly fully opened does not build up with sufficient speed to shift the piston of the control valve to its closed position in time to prevent it from connecting the conduit to the clutch with the atmosphere. Since this bypasses the clutch throttle the clutch is immediately disengaged allowing the engine speed to increase regardless of the speed of the vehicle. This uncontrolled increase in speed will cause a rough engagement of the gears with wear on the transmission and a jolting of the occupants of the vehicle.

SUMMARY OF THE INVENTION

An object of the present invention is to provide a hydraulic control device for an automatic transmission capable of smooth operation whether the gear change is the result of a normal down shift or a kick-down shift.

This result is achieved in accordance with the invention in that the piston of the control slide valve is constructed as a differential piston. The end surface of the piston that is exposed to the vehicle velocity-dependent control pressure is larger than the opposite end surface by such an amount that the piston is moved into the open end position and is maintained there, when the control pressures applied to both ends of the piston are equal. This of course results from the difference in surface areas of the two ends of the piston and the relation F = PA, where F is the force exerted on the piston, P is the pressure (force for unit area), and A is the area over which the pressure is exerted. One advantage in using a differential piston is that the control valve spring used in the system described in the above-identified copending application to load the control valve piston may be dispensed with. Accordingly, the piston of the present invention reacts with more sensitivity to modifications of the control pressures applied to both its ends and, as will be explained in greater detail later, the proper functioning of the transmission is ensured for kick-down shifts such as those which follow an easing up on the accelerator when the vehicle is traveling at high velocities.

Besides the difference in the surface areas of the two ends of the control-valve piston, the piston of the present invention also has a recessed section arranged between the ends of the piston. During a gearing-down operation the piston is moved to the open end position corresponding to the engagement of the lower gear and this recessed area suitably bridges the clutch throttle or restriction. The recessed area provides an additional surface area for the pressure from the main slide valve, thereby in the high gear position overcoming the differential pressure of both ends of the piston and assuring that the control valve is completely closed at the beginning of the down-shifting process.

BRIEF DESCRIPTION OF THE DRAWINGS

The foregoing and other features of the present invention will be more readily apparent from the following detailed description and appended drawing of an illustrative embodiment of the invention in which an automatic transmission is shown in the course of a kick-down shift from the third to the second gear.

DESCRIPTION OF THE PREFERRED EMBODIMENT

The preferred embodiment of a hydraulically controlled automatic transmission in accordance with the invention comprises a main slide valve 1, a clutch 2, a brake 3, a pressure reservoir 22 and a control slide valve 40. The drawing represents a shifting phase in which the slide valve 1 has already shifted from the position corresponding to the third gear, but the associated clutch 2 and brake 3 have not yet carried out their movement. A piston 4 of the slide valve 1 receives a hydraulic medium at a pressure that is a function of the vehicle speed on one of its ends 4a over a conduit 5. At the other end 4b of the piston, hydraulic medium at a pressure that is a function of the engine load is delivered over a conduit 6. This other end 4b of the piston 4 also has the force of a spring acting against it. The piston 4, which is of stepped design, additionally has the pressure in a conduit 7 connected between its ends for kick-down shifting. This piston 4 controls a servo pressure circuit, which provides the actuating pressures for the individual shift servomotors of the gears, by connecting the main slide-valve conduit 8 either to a servo pressure delivery conduit 10, provided with a constriction or throttle 9, or to the atmosphere at point 0.

The main slide-valve conduit 8 continues as conduit 11 leading to the larger surface 12a (release end) of a stepped brake piston 12, which operates the brake 3. The pressure in the conduit 11 is aided by a spring, which is also connected to the release end 12a of the brake piston 12. The forces exerted by the fluid and spring on the release end tend to move the piston 12 in such a way (down as illustrated) as to cause the brake 3 for the lower speed gear to be released. The smaller surface 12b or application end of the brake piston 12 is connected with a conduit 13 in which servo pressure prevails and in which are arranged a throttle or constriction 14 and a check valve 15. The check valve operates to keep the hydraulic medium from flowing back from the brake 3 and bypassing throttle 14 when the piston 12 moves up, but allows it to be bypassed when the piston 12 moves down. The throttle also controls the application time for the brake.

Branching from the conduit 8 is a conduit 16 to which is connected a clutch throttle 17 and the check valve 18 bridging the throttle. On the other side of the clutch throttle 17 and the check valve 18 is a clutch conduit 19 which in turn branches into the conduits 19a and 19b.

The conduit 19a leads to the engagement end 20a of a clutch piston 20 located in the clutch 2. A spring 21 tends to force the piston 20 in the direction (right in the illustration) which causes it to disengage the clutch. The conduit 19b opens into a pressure reservoir 22 below a piston 24 arranged in a closed cylinder 23 forming the container for the reservoir. The piston 24 is engaged on its bottom surface 24a by a compression spring 25 and the piston head 24b is provided with servo pressure by way of conduit 26.

Between the conduit 16 and the clutch conduit 19 there is a bypass conduit 27 that bridges the clutch throttle 17 and the check valve 18. This bypass conduit 27 with its inlet conduit 28 and outlet conduit 29 contains a control slide valve 40. The piston 41 of control valve 40 is of stepped design, having a larger piston surface 44 and a smaller piston surface 46 at opposite ends. The piston receives pressure, which is a function of the velocity of the vehicle, on its larger surface 44 through the conduit 43. Between its ends the piston 41 is formed with a recess 42. The length of the recess 42 is such that in one of the end positions of the piston 41 the intake 28 and outlet 29 are directly connected with each other through the recessed area; but in the other end position (illustrated in the drawing) the piston 41 closes the flow path through the control slide valve 40. In this position the fluid from the conduit 28 can apply pressure by way of the channel 45 on the smaller surface 46 of the piston 41. In the recessed area there is produced an effective intermediate surface 46a on the piston 41, which area is equal to the differential areas of the ends of the piston. The recessed area is connected to the main slide valve 1 by means of the conduits 29, 16 and 8, so that the intermediate surface 46a is always exposed to the pressure of the main valve conduit 8.

The interaction of the control elements shown in the drawing will now be described for a change from the third-speed gear to the second-speed gear. When the transmission is in the third-speed gear, both the piston 4 of the slide valve 1 and the piston 41 of the control slide valve 40 are in their left-hand positions (the piston 4 is shown in its right-hand position in the drawing). The servo pressure prevailing in the supply conduit 10 keeps the clutch 2 engaged by way of conduits 8, 16 and 19, and also keeps the brake released through the conduits 8 and 11. The shifting of the transmission down to the second speed gear is initiated through a displacement of the piston 4 from left to right by the modification of the control pressures in the conduits 5 and 6 (and 7, if applicable) thereby connecting the main valve conduit 8 to the atmosphere at conduit 0. The pressure on the release end 12a of the brake piston 12 is immediately relieved and the brake piston 12 is slowly moved toward application of the brake (upward in the illustration) by the servo pressure applied to the application end 12b of the piston by flow through the throttle 14. The brake 3 is always applied, after a predetermined period of time, which is long enough for completion of the shifting process. This period is controlled by the size of the throttle 14. The application of brake 3 engages the lower gear once it has been shifted into position.

Even though the clutch 2 is also connected by way of conduit 16 with conduit 8, the servo pressure in the clutch is reduced slowly. This delay in the reduction of the pressure on the engagement end 20a of the clutch piston 20 is controlled with the help of the control slide valve 40, the pressure reservoir 22 and the clutch throttle 17. The pressure in the clutch 2 is discharged over the conduit 19 and throttle 17 as a function of the characteristics of the pressure reservoir 22 until the pressure on the smaller surface 46 of the control slide valve 40 has been reduced to such an extent that the control pressure prevailing in conduit 43, which is a function of the vehicle velocity, acting on the larger surface 44 displaces the piston 41 to the right-hand position. With the piston 41 in the right-hand position the conduit 27 is opened and the throttle 17 is bypassed. As a result the clutch conduit pressure drops steeply, the clutch 2 is disengaged by the spring 21, and the engine speed increases until the brake 3 is applied at the end of the fixed period of time. The amount of time which it takes for the control slide valve to switch the bypass conduit 27 open, thereby terminating the effective range of the pressure reservoir 22, will depend on the magnitude of the control pressure in the conduit 43, which is a function of the vehicle velocity. The more time it takes for the control slide valve to open conduit 27 the later the clutch 2 will be released and the less time the engine will have to increase its speed before the brake 3 is applied by the fluid flow through throttle 14. The timing of the operation is such that the engine has just enough time to get to the proper speed for smooth engagement of the lower speed gear by the application of the brake.

The piston 24 of the pressure reservoir 22 is forced against the constantly applied servo pressure in the conduit 26 by the pressure in the conduit 19 and the spring 25. Filling of the pressure reservoir 22 occurs during shifting up to the third speed gear by way of conduit 8, check valve 18 and conduits 19 and 19b. As the piston 24 moves (upward in the drawing) the slide valve 40 shifts to the left because of the pressure build-up on the smaller surface 46 and on the intermediate surface 46a of the piston 41 produced by the recess 42.

In contrast to the device described in the copending U.S. Pat. application Ser. No. 273,720, the piston 41 in the present invention is always maintained in the left-hand position when the transmission is in the third-speed gear. This is true regardless of the gas pedal position and the vehicle velocity because the smaller surface 46 and the effective intermediate surface 46a of the piston 41 are always under servo pressure whereby the surface 46 is connected to the clutch conduit 19 and the intermediate surface 46a to the main valve conduit 8. Additionally, the surfaces 46 and 46a combined are at least equal to the area of the larger surface 44 and even under the most unfavorable conditions the servo pressure is always slightly greater than the speed-dependent control pressure which is applied to the larger surface 44. Accordingly, the piston 41 is always in the position in which the speed of the vehicle is taken into account during the gearing down operation. Hence, if the accelerator is suddenly opened fully while the vehicle is travelling in the third speed gear, the closed position of the control slide valve will prevent the pressure on the clutch 2 from being dropped through the bypass conduit 27, thereby preventing an immediate jolting kick-down shift. Further, with this arrangement the control valve spring is eliminated and the control valve piston is more sensitive to modifications in the pressures applied to the surfaces.

While the invention has been particularly shown and described with reference to the preferred embodiment thereof, it will be understood by those skilled in the art that various changes in form and details may be made therein without departing from the spirit and scope of the invention. Accordingly, the invention includes all structure that is within the scope of the appended claims.

I claim:

1. Hydraulic control apparatus for controlling the automatic shifting of planetary gear means driven by an engine when down-shifting an automatic transmission comprising:

clutch means associated with a higher gear of the transmission, said clutch having a clutch piston with an application end;

pressure reservoir means having a double-ended reservoir piston with a spring load on one end and transmission servo pressure on the other end, a conduit connecting the chambers containing the application end of the clutch piston and the spring-loaded end of the reservoir piston;

brake means associated with a lower gear of the transmission, said brake means comprising a double-ended brake piston with an application end and a release end, servo pressure being applied to the application end of the brake piston through a brake throttle;

main slide valve means comprising a piston that moves as a function of control pressures derived from the vehicle velocity and engine load, said main slide valve means connecting a main valve conduit to the servo pressure when the vehicle is in the higher gear and connecting it to the atmosphere during a shift to a lower gear, the main valve conduit being directly connected to the release side of the brake piston, and to the application end of the clutch piston and the spring-loaded end of the reservoir piston through a clutch throttle and a clutch conduit in series; and control slide valve means having a double-ended control valve piston, the position of the control valve piston controlling the passage of hydraulic fluid through a bypass conduit which bypasses the clutch throttle, the control valve piston having the pressure in the clutch conduit applied to one end and a vehicle-velocity-dependent pressure applied to the other end, whereby a change to a lower gear causes said main slide valve means to vent the pressure in the main valve conduit, causing application of said brake means in a fixed period of time and allowing the clutch means to remain engaged by causing the pressure in the clutch conduit to decrease slowly through the clutch throttle until said pressure reservoir has been drained by the opening of the bypass conduit when the velocity-dependent pressure on said control slide valve exceeds the slowly decreasing pressure in the clutch conduit, characterized in that;

the control valve piston is a stepped piston with the end in contact with the velocity-dependent control pressure being larger in area than the opposite end in contact with the clutch conduit pressure by such an amount that the control valve piston is moved to open the bypass conduit when the clutch conduit pressure and the velocity-dependent pressure are equal.

2. Apparatus as claimed in claim 1, characterized in that the control valve piston has a recessed area between its larger and smaller ends, the length of the recessed area being such that it provides a passage between segments of the bypass conduit when the control valve piston is in its open position, thereby opening the bypass conduit.

3. Apparatus as claimed in claim 2, characterized in that the main valve conduit pressure is applied to the recessed area, an effective intermediate surface in the recessed area being acted on by the main valve conduit pressure in the direction of closing the control valve, the effective intermediate surface of the recessed area combined with the area of the end of the control valve piston in contact with the clutch conduit pressure being large enough to cause the control valve to close in the high gear position of the main slide valve when the servo pressure in the main valve conduit and the clutch conduit is at least slightly greater than the speed-dependent control pressure acting on the larger end surface of the piston.

* * * * *